United States Patent [19]

Hochlan, Jr.

[11] Patent Number: 4,791,995

[45] Date of Patent: Dec. 20, 1988

[54] MANUAL TILLER, MULCHER, WEEDER TOOL

[76] Inventor: Eugene Hochlan, Jr., 225 Linden Ave., Council Bluffs, Iowa 51501

[21] Appl. No.: 142,441

[22] Filed: Jan. 11, 1988

[51] Int. Cl.$^4$ .......................... A01B 1/16; A01B 45/02
[52] U.S. Cl. ........................................ 172/21; 111/99; 172/379
[58] Field of Search .................... 172/21, 379; 111/99

[56] References Cited

U.S. PATENT DOCUMENTS

| | | | |
|---|---|---|---|
| 827,884 | 8/1906 | Ritter | 111/99 |
| 1,893,258 | 1/1933 | Washburn | 172/21 |
| 1,965,177 | 7/1934 | Finkl | 172/21 |
| 2,020,571 | 11/1935 | Pick | 172/21 |
| 2,747,528 | 5/1956 | Hunkins | 111/92 |
| 3,168,150 | 2/1965 | Kappler | 172/371 |
| 3,180,427 | 4/1965 | Leeper, Jr. | 172/21 |
| 4,244,308 | 1/1981 | Vince | 111/89 |
| 4,511,004 | 4/1985 | Deneen | 172/21 |

FOREIGN PATENT DOCUMENTS

| | | | |
|---|---|---|---|
| 1433753 | 2/1966 | France | 111/99 |
| 856537 | 12/1960 | United Kingdom | 172/21 |
| 1306212 | 2/1973 | United Kingdom | 172/21 |

*Primary Examiner*—Richard T. Stouffer
*Attorney, Agent, or Firm*—Zarley, McKee, Thomte, Voorhees & Sease

[57] ABSTRACT

A manual tiller, mulcher and weeder tool has an elongated upright handle having its lower end connected to a horizontal top plate which has a series of diamond-headed tines extended downwardly in parallel spaced apart relation from the underside of the top plate. A cleaning plate has a series of holes aligned with the tines for vertical sliding movement of the cleaning plate on the tines. Compression springs mounted on selected tines urge the cleaning plate to a lowered position adjacent the tine heads.

10 Claims, 3 Drawing Sheets

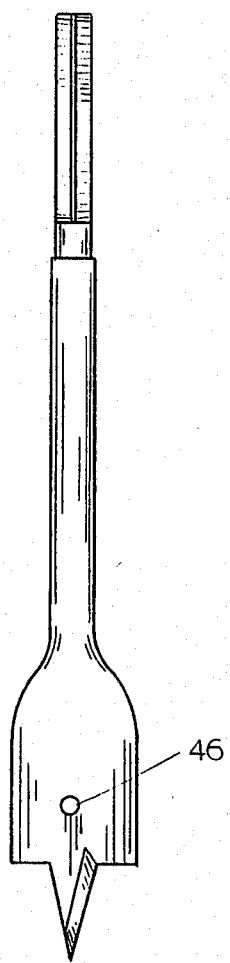
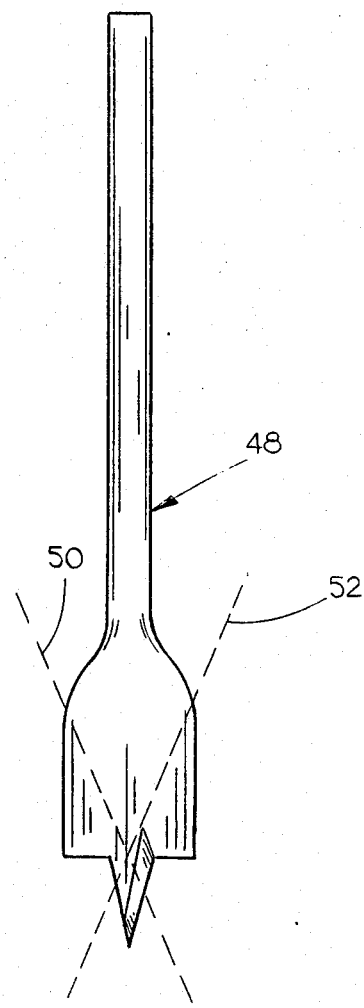
FIG. 7  
PRIOR ART
FIG. 8  
PRIOR ART

4,791,995

MANUAL TILLER, MULCHER, WEEDER TOOL

BACKGROUND OF THE INVENTION

The present invention is directed generally to a tool for manually tilling, mulching and weeding the ground in preparation for planting grass or other seeds for gardening. More particularly, the present invention is directed to such a manual tool which can be easily and comfortably operated to very efficiently till a top layer of soil without dispersing the tilled soil from its original position.

Manual cultivating tools have previously been disclosed such as in the 1934 Finkl U.S. Pat. No. 1,965,177 wherein a lawn cultivating tool has a plurality of spikes extending downwardly from a top plate and a cleaning plate spring mounted to the top plate independently of the spikes. Whereas the Finkl tool is capable of punching a series of holes in the ground which may be useful for aerating the soil, it is inoperative for tilling, mulching and weeding since the cleaning plate simply holds the soil in place as the spikes are withdrawn from the punched holes in the ground.

Soil can be manually tilled with a shovel, hoe or garden rake but the use of these tools generally requires much effort and skill and it is difficult to confine the tilling operation to a very small area with these tools. Accordingly, the present invention is directed to an improved manual tilling, mulching and weeding tool.

Another object is to provide such a tool which is light weight, balanced and designed for operation with minimum effort.

Another object is to provide an improved tilling, mulching and weeding tool having tines designed to accomplish tilling of the soil in response to vertical movement of the tine heads within the soil.

Another object is to provide such a tool having a cleaning plate which is spring mounted on a selected number of the tines.

Another object is to provide such a tool which is simple and rugged in construction, economical to manufacture and efficient in operation.

SUMMARY OF THE INVENTION

The manual tilling, mulching and weeding tool of the present invention includes an elongated handle extended vertically upwardly from a rigid horizontal top plate having a plurality of tines extended vertically downwardly therefrom in generally parallel spaced apart relation. Each tine has a generally diamond-shaped head on the bottom end, which head includes downwardly diverging top edges and a pair of sharp downwardly converging bottom edges for cutting through the soil in response to lowering of the handle. A cleaning plate has a plurality of holes aligned with the tine shanks so as to be slidably mounted on the tine shanks and spring biased toward a lowered position against the tine heads. Compression springs associated with the cleaning plate are mounted on selected tine shanks thereby to eliminate unnecessary weight and parts for most efficient operation.

Downward movement of the handle causes the tines to penetrate the ground with the cleaning plate engaging the surface of the ground surrounding the tines. The penetrating tines cut through and break up the soil. The compression springs then assist with the withdrawal of the tines from the ground whereupon the top edges of the tines tend to lift and mix up the soil between the tines. The cleaning plate prevents the soil from being displaced from its original position below the cleaning plate. Accordingly, the tool is useful for tilling even very small patches of grass seed, for example, as well as for very large gardens since minimal effort is required for operating the tool of the invention.

BRIEF DESCRIPTION OF THE DRAWINGS

FIG. 7 is a perspective view of a prior art spade wood-boring drill bit; and

FIG. 8 is side elevational view of a prefinished drill bit blank from which the tine of the invention may be formed as indicated in dotted lines.

DESCRIPTION OF THE PREFERRED EMBODIMENTS

Figure 1:
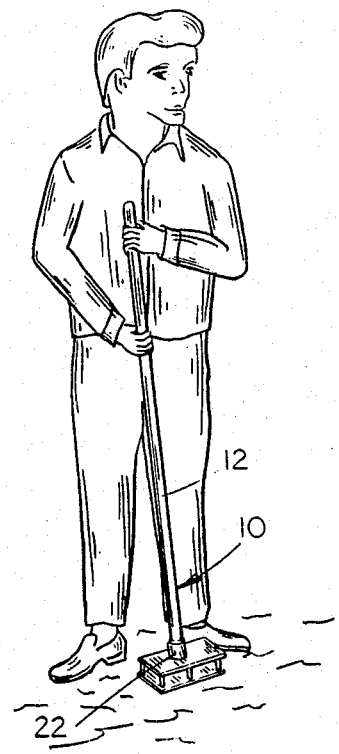
FIG. 1 is a perspective view of an operator using the tool of the invention.

The tilling, mulching and weeding tool 10 of the present invention is illustrated in the drawings as including an elongated upright handle 12 connected to a top plate 14 having a group of diamond-headed tines 16 protruding downwardly therefrom with a spring mounted cleaning plate 18 vertically slidable on the tines and urged to a lowered position by compression springs 20.

Figure 5:
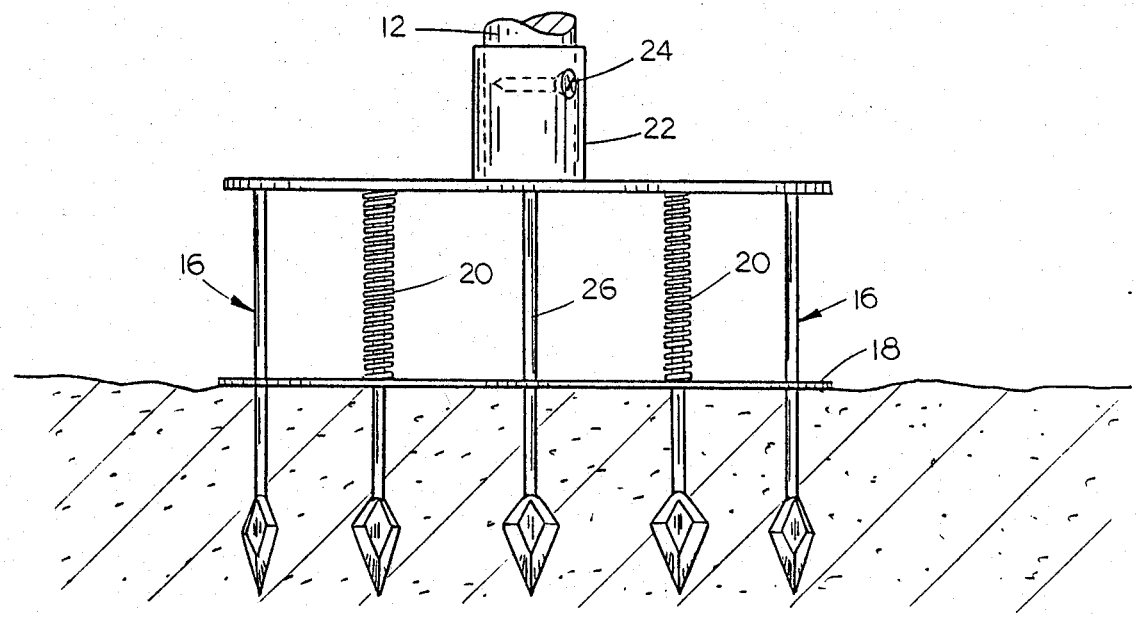
FIG. 5 is a partial side view showing the tines turning the earth.
Figure 6:
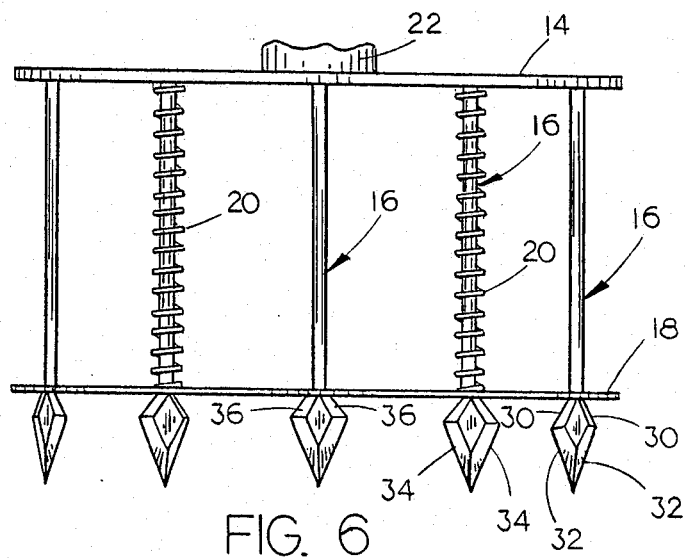
FIG. 6 is a partial side view showing the cleaning plate in its lowered position resting against the heads of the tines.

Top plate 14 is preferably a flat plate, as illustrated, although it may be a perforated frame member or any other structure capable of supporting the tines in spaced apart parallel relation. A coupling sleeve 22 (FIG. 5) is welded or otherwise secured to top plate 14 for securing the handle 12 to the top plate upon insertion of the lower end of the handle into the sleeve 22 and inserting a set screw 24 through the sleeve and handle. The sleeve is positioned for centering the handle relative to the top late and it is preferred that the handle extend upwardly at a perpendicular angle so as to be vertically disposed when the top plate is horizontal. Accordingly, any line of force applied through the handle is parallel to the axes of the tines.

Each tine 16 includes an elongated shank 26, which may be a ¼ inch diameter steel rod, for example, with a diamond-shaped head 28 on the lower end thereof. Head 28 is a generally flat member, preferably of about 3/16 inch thickness, and is formed to include a pair of downwardly diverting top edges 30 and a pair of sharpened downwardly converging bottom edges 32. The bottom edges preferably converge at an acute angle to facilitate penetration into the ground. The angle between the two top edges 30 need not be acute but some angular relation between the top edges and cleaning plate is preferred to prevent the clogging or collection of soil between the two when the tines are withdrawn from the ground. Beveled edges 34 show that the bottom edges 32 are sharpened and the top edges 30 may also be sharpened as illustrated by beveled edges 36. As illustrated, the head 28 is taller than it is wide and wider than it is thick to facilitate penetration into the ground yet the head is substantially wider than the shank diameter to facilitate tilling of the soil.

Figure 2:
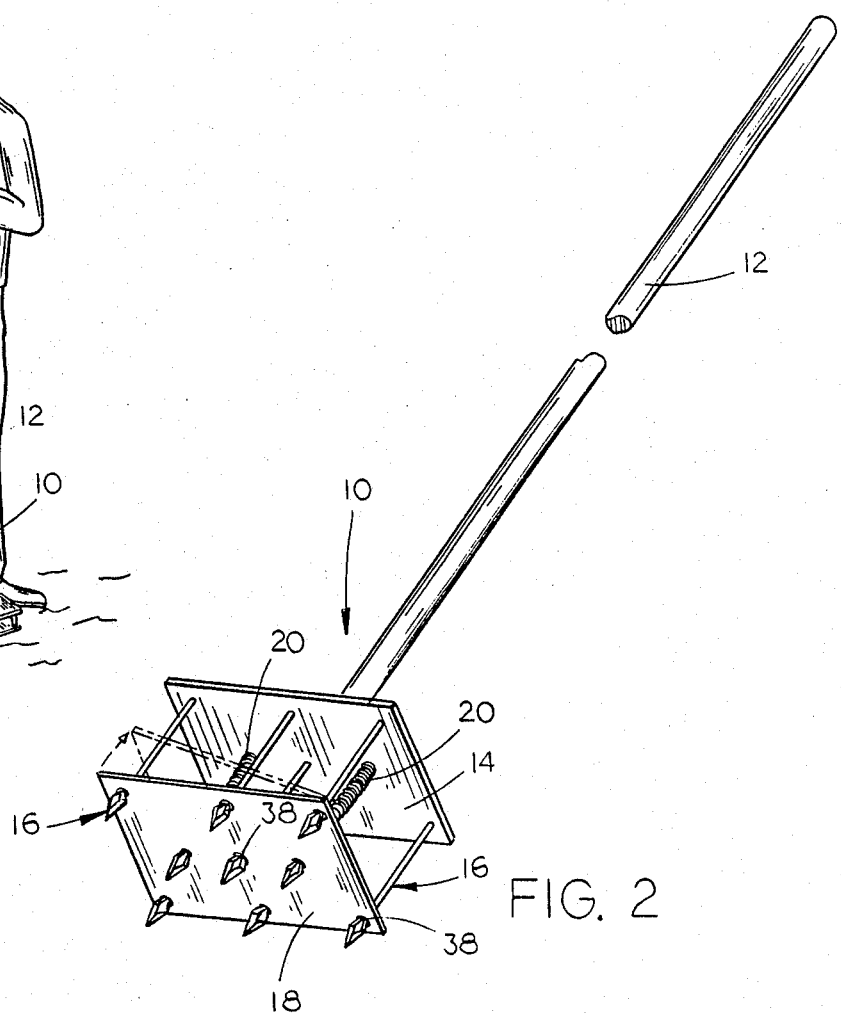
FIG. 2 is an enlarged perspective view of the tool.
Figure 3:
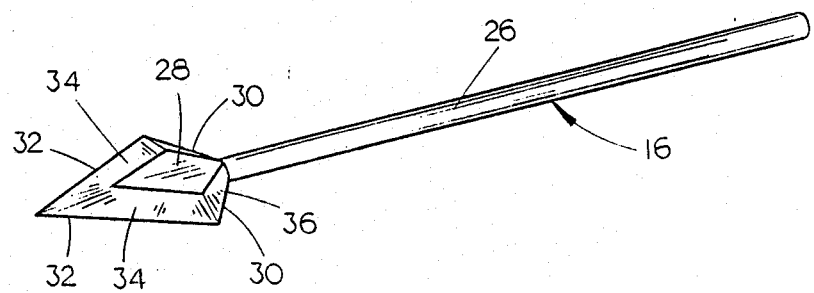
FIG. 3 is a further enlarged perspective view of one tine of the tool.

Cleaning plate 18 has a series of holes 38 positioned for alignment with the tine shanks 26 and with the tine shanks extending through the holes 38 in the cleaning plate so that the cleaning plate is vertically slidable on the tine shanks. A pair of compression springs 20 are placed or wound onto a couple of generally centrally positioned tine shanks between the cleaning plate 18 and top plate 14 for urging the cleaning plate downwardly to a lowered position in engagement with the heads 28. It can be seen in FIG. 5 that when the tines are penetrated into the ground, cleaning plate 18 rests on the surface of the ground and slides vertically upward relative to the tines to an upper most position wherein the compression springs 20 are fully compressed. In FIG. 2 it is evident that the cleaning plate holes 38 have a larger diameter than the width of the tine shanks 26 so that the cleaning plate may be inclined relative to the top plate 14 when it rests on an inclined ground surface.

Figure 4:
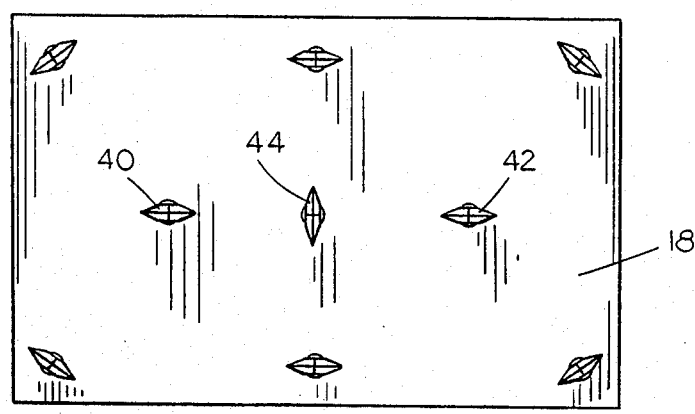
FIG. 4 is a bottom view illustrating the position and inclination of the tines.

FIG. 4 illustrates the fixed orientation of the various tine heads 28 relative to top plate 14 and one another. The tines are arranged three rows of three tines each, with the center row having its outer most tines 40 and 42 spaced closer together than the outer most tines of the other rows for more effective tilling and for centrally positioning of the compression springs 20. Also, whereas several of the tines are oriented to extend transversely parallel to the long edges of top plate 14, the outer most tines of the outer most rows are inclined relative to the long sides of the top plate and the center tine 44 of the middle row is oriented to extend transversely in a direction perpendicular to the long sides of top plate 14. This particular pattern is not critical to the invention but the varied orientation of the various tine heads does facilitate more effective tilling action of the tool.

FIGS. 7 and 8 illustrate an economical alternative for construction of the tines 16. FIG. 7 illustrates a conventional ⅜ inch spade wood-boring drill bit. Whereas the finished drill bit would be unacceptable for forming the tines because of a hole 46 that is conventionally drilled through the cutting head, the prefinished blank 48 illustrated in FIG. 8 is readily adapted to formation of tines 16. The ¼ inch uniform diameter shank having a length of 4 to 4¼ inches is substantially ideal and the cutting head may be cut along lines 50 and 52 to form bottom edges 32 which may then subsequently be sharpened.

In operation, the user grips the top of handle 12 and holds it vertically oriented out away from his body. To till an area of soil, he need only move the handle downwardly to effect penetration of the tines into the soil and then lift the handle to withdraw the tines from the soil. No heavy pounding is required as gravity and the weight of the tool will do most of the work. Each time the tool is withdrawn from the ground, the handle is twisted slightly before reinserting the tool into the ground so that the tines penetrate different spots at different angles. Proceeding in this manner, it has been found that one square foot of ground can be thoroughly tilled and readied for seeding in just two minutes. The wide top edges 30 of each tine head 28 tend to lift and turn the soil on the withdrawal stroke of the tool. The cleaning plate 18 serves to keep the tine shanks clean and to maintain the soil which is being cultivated in place below the cleaning plate so that the soil isn't scattered about on the up stroke of the tool thereby remulching the soil in the exact spot that is being tilled. Furthermore, the spring mounted cleaning plate tends to lightly tamp the tilled soil to maintain the original ground contour. The tool can furthermore be used to lightly tamp soil after seeding with the tine heads 28 acting to aerate the tilled seeded area. It is preferred that the tine length be such that the heads may penetrate to a depth of approximately four inches, it being understood that a penetration depth of approximately two to three inches is sufficient for tilling the soil for preparation for planting of grass seed.

Whereas the invention has been shown and described herein in connection with preferred embodiments thereof, it is understood that many modifications, substitutions and additions may be made which are within the intended broad scope of the appended claims.

Thus, there has been shown and described a manual tiller, mulcher and weeder tool which accomplishes at least all of the stated objects.

I claim:

1. A manual tiller, mulcher, weeder tool comprising,
a generally horizontal top frame member,
an elongated handle connected to and extended generally vertically upwardly from said top frame member,
a plurality of tines connected to said top frame member and extended generally vertically downwardly therefrom in generally parallel spaced apart relation,
each of said tines including an elongated shank having top and bottom ends and a generally diamond-shaped head on said bottom end each said head including a pair of downwardly diverging top edges and a pair of sharpened downwardly converging bottom edges, and having a width greater than the diameter of said shank,
a cleaning plate having a plurality of holes positioned for alignment with each of said tine shanks,
said shanks extending through said cleaning plate holes whereby said cleaning plate is vertically slidable on said shanks between a lowered position above and adjacent said tine heads, and an elevated position above and spaced from said tine heads, the diameter of the holes in said cleaning plate each being less than the width of the respective one of the tine heads mounted to that one of said shanks passing through that particular one of the holes in the cleaning plate, and
compression spring means mounted on said tine shanks and operative to urge said cleaning plate toward the lowered position.

2. The tool of claim 1 wherein said compression spring means comprises a pair of generally cylindrical wound compression springs having axial openings therethrough with a respective pair of said tine shanks slidably inserted therethrough.

3. The tool of claim 1 wherein said cleaning plate holes have a sufficiently larger diameter than the width of said tine shanks to allow said cleaning plate to be inclined relative to said top frame member without binding on said tines.

4. The tool of claim 3 wherein said bottom edges of each of said tines converge to form an acute angle at the bottom tip of the tine head.

5. The tool of claim 4 wherein said top frame member comprises a flat plate.

6. The tool of claim 5 wherein the top ends of the tine shanks are welded to said top frame member.

7. The tool of claim 6 wherein said top edges of each of said tine heads are sharpened.

8. The tool of claim 7 wherein said handle is centrally positioned relative to said plurality of said tines.

9. The tool of claim 8 wherein said tine shanks are of a length to permit said tine heads to penetrate a depth of at least three inches into the ground upon movement of the cleaning plate to its elevated position.

10. The tool of claim 9 wherein said plurality of said tines includes nine tines arranged in three rows of three tines each.

* * * * *